(12) United States Patent
Murakami et al.

(10) Patent No.: US 9,026,877 B2
(45) Date of Patent: May 5, 2015

(54) TRANSMITTING APPARATUS, RECEIVING APPARATUS, TRANSMISSION METHOD, AND RECEPTION METHOD

(71) Applicant: Panasonic Corporation, Osaka (JP)

(72) Inventors: Yutaka Murakami, Osaka (JP);
Katsuaki Abe, Kanagawa (JP);
Masayuki Orihashi, Kanagawa (JP);
Akihiko Matsuoka, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 1 day.

(21) Appl. No.: 13/957,748

(22) Filed: Aug. 2, 2013

(65) Prior Publication Data

US 2013/0315343 A1 Nov. 28, 2013

Related U.S. Application Data

(63) Continuation of application No. 11/940,381, filed on Nov. 15, 2007, now Pat. No. 8,527,827, which is a continuation of application No. 11/413,155, filed on Apr. 28, 2006, now Pat. No. 7,328,389, which is a continuation of application No. 10/466,103, filed as application No. PCT/JP02/11921 on Nov. 15, 2002, now Pat. No. 7,069,489.

(30) Foreign Application Priority Data

Nov. 21, 2001 (JP) .................................. 2001-356400

(51) Int. Cl.
*H04L 1/00* (2006.01)
*H04L 27/00* (2006.01)
(Continued)

(52) U.S. Cl.
CPC ............ *H04L 1/0083* (2013.01); *H04L 1/0003* (2013.01); *H04L 1/0009* (2013.01);
(Continued)

(58) Field of Classification Search
CPC ... H04L 1/0045; H04L 1/0057; H04L 1/0061; H04L 1/0071; G11B 20/18
USPC ........................................................ 714/746
See application file for complete search history.

(56) References Cited

U.S. PATENT DOCUMENTS 5,309,161 A * 5/1994 Urkowitz et al. ............. 342/132
5,497,401 A    3/1996 Ramaswamy et al.
(Continued)

FOREIGN PATENT DOCUMENTS

CN    1147737    4/1997
EP    0903883    3/1999
(Continued)

OTHER PUBLICATIONS

"Development of an Adaptive Modulation System for Land Mobile Communications—Outline of the Scheme", Hamaguchi et al., IEICE Communications Society Conference B-5-135, pp. 388, together with a partial translation (Sep. 1997).

*Primary Examiner* — Albert Decady
*Assistant Examiner* — Enam Ahmed
(74) *Attorney, Agent, or Firm* — Greenblum & Bernstein, P.L.C.

(57) ABSTRACT

In a communication system in which propagation path error tolerance is improved by switching the modulation method or error correction method adaptively according to the state of the propagation path, signals MX, MY, CX, and CY indicating the modulation method and error correction method used by the transmitting side are transmitted arranged at discrete locations within the same frame. By this means, the possibility of discretely arranged signals MX and MY, or CX and CY, both degrading is made low even if the transmit signal experiences fading or propagation path fluctuations. As a result, it is possible for the modulation method information signal and/or error correction method information signal to be restored correctly on the receiving side.

16 Claims, 10 Drawing Sheets

(51) Int. Cl.
*H04L 27/26* (2006.01)
*H04L 1/08* (2006.01)

(52) U.S. Cl.
CPC ............ *H04L1/0025* (2013.01); *H04L 1/0039* (2013.01); *H04L 1/0079* (2013.01); *H04L 1/08* (2013.01); *H04L 27/0008* (2013.01); *H04L 27/0012* (2013.01); *H04L 27/2608* (2013.01)

(56) References Cited

U.S. PATENT DOCUMENTS

| | | | |
|---|---|---|---|
| 5,715,275 | A | 2/1998 | Emi |
| 5,757,766 | A | 5/1998 | Sugita |
| 5,825,807 | A | 10/1998 | Kumar |
| 6,195,534 | B1 | 2/2001 | Sakoda et al. |
| 6,282,683 | B1 | 8/2001 | Dapper et al. |
| 6,324,667 | B1 * | 11/2001 | Sugaya ........................ 714/746 |
| 6,330,699 | B1 * | 12/2001 | Yoshioka et al. ............. 714/746 |
| 6,389,066 | B1 | 5/2002 | Ejzak |
| 6,396,804 | B2 * | 5/2002 | Odenwalder ................. 370/209 |
| 6,717,934 | B1 | 4/2004 | Kaasila et al. |
| 6,744,825 | B1 | 6/2004 | Rimstad et al. |
| 6,859,466 | B1 | 2/2005 | Chen et al. |
| 6,891,810 | B2 | 5/2005 | Struhsaker et al. |
| 6,891,897 | B1 | 5/2005 | Bevan et al. |
| 6,985,432 | B1 | 1/2006 | Hadad |
| 7,069,489 | B2 | 6/2006 | Murakami et al. |
| 7,106,689 | B1 | 9/2006 | Sudo |
| 7,190,744 | B2 * | 3/2007 | Xia et al. ...................... 375/341 |
| 7,512,189 | B2 * | 3/2009 | Chen et al. .................... 375/295 |
| 8,194,530 | B2 | 6/2012 | Webster et al. |
| 2001/0017896 | A1 | 8/2001 | Murakami et al. |
| 2001/0038630 | A1 | 11/2001 | Tong et al. |
| 2001/0055296 | A1 * | 12/2001 | Akiyama ...................... 370/344 |

FOREIGN PATENT DOCUMENTS

| | | |
|---|---|---|
| EP | 1054526 | 11/2000 |
| EP | 1128586 | 8/2001 |
| EP | 1130837 | 9/2001 |
| JP | 7-250116 | 9/1995 |
| JP | 8-84162 | 3/1996 |
| JP | 11-261535 | 9/1999 |
| JP | 2000-13356 | 1/2000 |
| JP | 2001-144722 | 5/2001 |
| JP | 2001-197138 | 7/2001 |
| JP | 2002-217864 | 8/2002 |

* cited by examiner

FIG.1    (PRIOR ART)

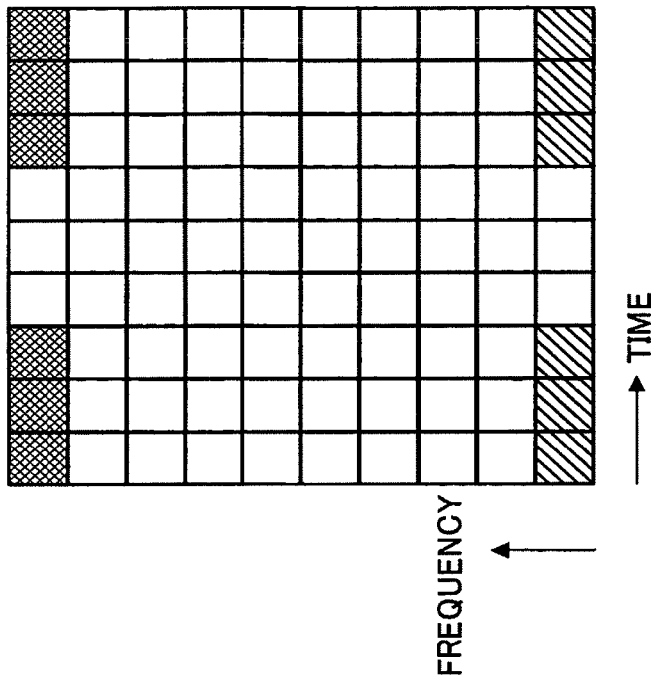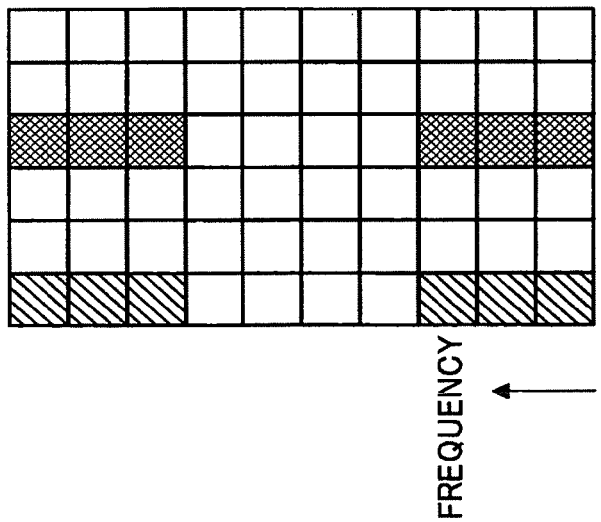

TRANSMITTING APPARATUS, RECEIVING APPARATUS, TRANSMISSION METHOD, AND RECEPTION METHOD

CROSS REFERENCE TO RELATED APPLICATIONS

This application is a continuation of pending U.S. patent application Ser. No. 11/940,381, filed Nov. 15, 2007, which is a continuation of U.S. patent application Ser. No. 11/413,155, filed Apr. 28, 2006, which is a continuation of U.S. patent application Ser. No. 10/466,103, filed Jul. 18, 2003, now U.S. Pat. No. 7,069,489, which is the U.S. National Stage of International Application No. PCT/JP02/11921, filed Nov. 15, 2002, which claims the benefit of Japanese Application No. 2001-356400, filed Nov. 21, 2001, the disclosures of which are expressly incorporated herein by reference in their entireties.

TECHNICAL FIELD

The present invention relates to a transmitting apparatus, receiving apparatus, transmission method, and reception method, and is suitable for application to a digital radio communication system in which the modulation method or error correction method is changed adaptively according to the propagation path environment, for example.

BACKGROUND ART

Conventionally, various kinds of system control are carried out in a radio communication system in order to perform communication with high quality and high efficiency. An example is a radio communication system in which the modulation method or error correction method is switched adaptively according to the state of the propagation path. In this kind of system, the current propagation path state is determined based on the SIR (Signal to Interference Ratio) of a signal that a transmitting/receiving apparatus receives from a communicating party, or the like.

In practice, when the propagation path state is good, information data undergoes digital modulation using an M-ary modulation method with a large information bearing capacity per symbol, such as 64QAM, for example, and is transmitted with the addition of an error correction code with a high degree of redundancy as an error correction method. When the propagation path state is poor, on the other hand, information data undergoes digital modulation using a modulation method with a small information bearing capacity per symbol, such as 16QAM or QPSK, for example, and is transmitted with the addition of an error correction code with a low degree of redundancy as an error correction method.

Thus, in this kind of radio communication system, it is necessary to communicate to the receiving side the modulation method used to modulate a transmit signal and the error correction method used for error correction processing. A receiving apparatus has a plurality of demodulation sections corresponding to a plurality of modulation methods, and a plurality of error correction decoding sections corresponding to a plurality of error correction methods, and restores the original data by executing demodulation processing and error correction processing in accordance with a communicated modulation method information signal and error correction information signal.

An example of a known frame configuration for arranging signals indicating a modulation method within a transmit frame is that described in "Development of an Adaptive Modulation System for Land Mobile Communications—Outline of the Scheme—", Hamaguchi et al., IEICE Communications Society Conference B-5-135 pp. 388, September 1997.

FIG. 1 shows this frame configuration. Located in order from the start of the frame are one ramp symbol R, six synchronization symbols SW, one pilot symbol P, one modulation method information symbol I, and 18 data symbols DATA.

A receiving apparatus that receives a signal with this kind of frame configuration determines the modulation method of data symbols DATA from modulation method information symbol I, and demodulates data symbols DATA using a demodulation method corresponding to the determined modulation method.

If, in the receiving apparatus, determination of modulation method information symbol I or an error correction method information symbol (not shown) is incorrect, the data obtained by demodulation and decoding of data symbols DATA will be incorrect. It is therefore important for modulation method information and error correction method information to be transmitted to the receiving apparatus correctly.

However, in radio communications, there is a risk of modulation method information and error correction method information being erroneously determined on the receiving side due to noise, or fading caused by propagation path fluctuations, resulting in a reduction in communication quality.

DISCLOSURE OF INVENTION

It is an object of the present invention to provide a transmitting apparatus, receiving apparatus, transmission method, and reception method that make it possible for the modulation method and error correction method of a digitally modulated signal to be determined correctly on the receiving side, enabling communication quality to be improved.

This object is achieved by, in a communication system in which propagation path error tolerance is improved by switching the modulation method or error correction method adaptively according to the state of the propagation path, transmitting signals indicating the modulation method and error correction method used by the transmitting side arranged at discrete locations within the same frame.

BRIEF DESCRIPTION OF DRAWINGS

FIG. 10(A) is a drawing showing a case where modulation method information symbols and error correction method information symbols are arranged discretely in the frequency direction in an OFDM signal;

FIG. 10(B) is a drawing showing a case where modulation method information symbols and error correction method information symbols are arranged discretely in the time direction in an OFDM signal.

BEST MODE FOR CARRYING OUT THE INVENTION

With reference now to the accompanying drawings, embodiments of the present invention will be explained in detail below.

(Embodiment 1)

Figure 1:
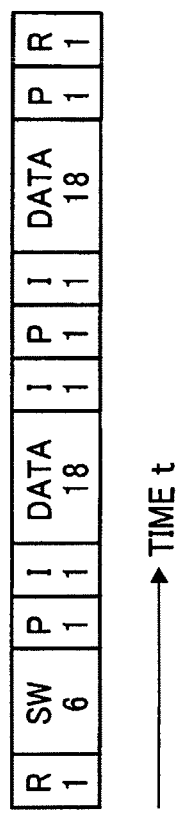
FIG. 1 is a drawing showing a conventional transmit frame configuration.
Figure 2:
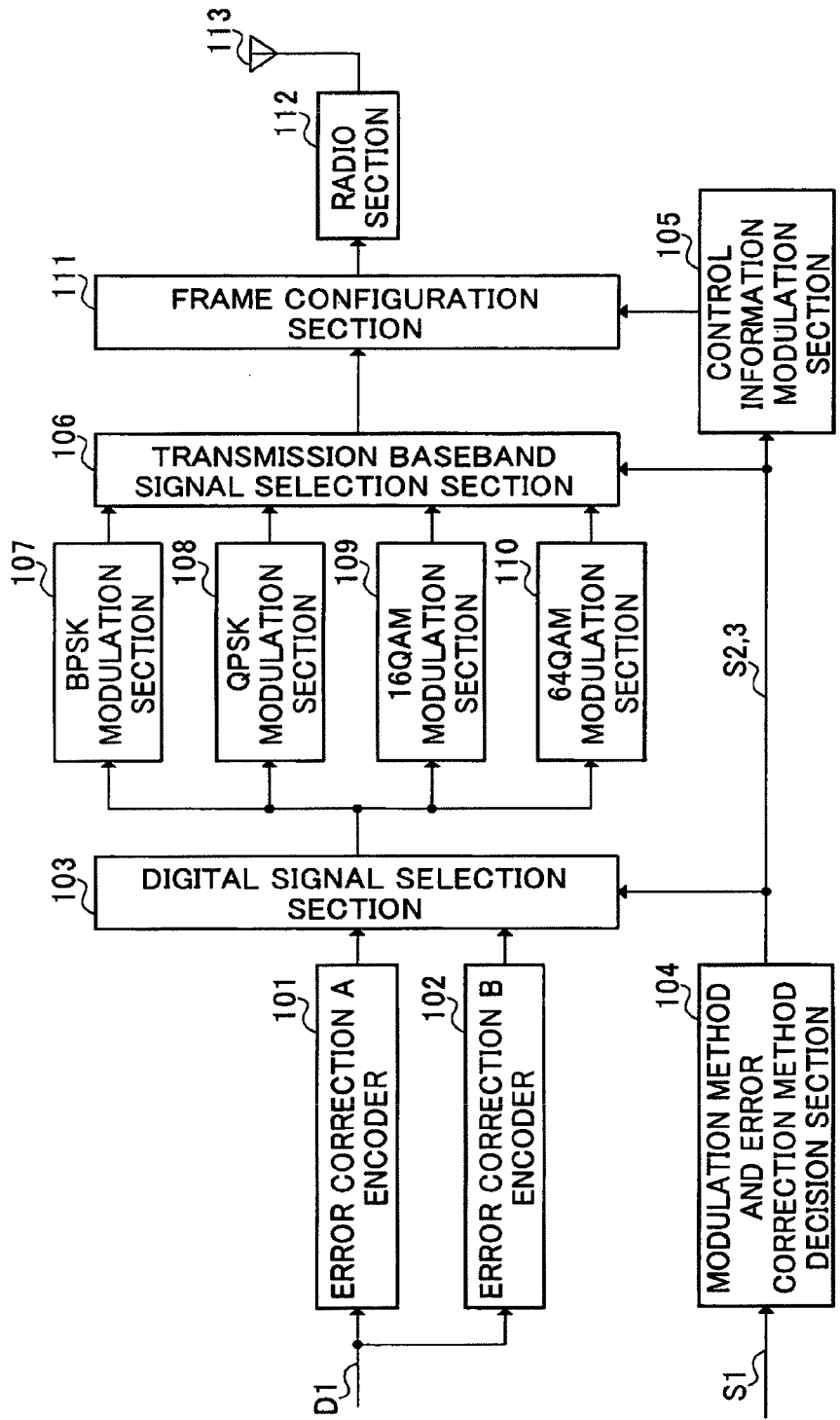
FIG. 2 is a block diagram showing the configuration of a transmitting apparatus according to Embodiment 1 of the present invention.

FIG. 2 shows the configuration of a transmitting apparatus according to Embodiment 1 of the present invention. Transmitting apparatus 100 can select an error correction method and modulation method adaptively according to the state of the propagation path. In transmitting apparatus 100, a transmit digital signal D1 is input to an error correction A encoder 101 and error correction B encoder 102.

Error correction A encoder 101 and error correction B encoder 102 perform error correction processing with different degrees of redundancy. Specifically, error correction B encoder 102 performs error correction processing with a higher degree of redundancy than error correction A encoder 101, as a result of which error correction B encoder 102 obtains error correction coded data with higher error tolerance. Error correction coded data obtained by error correction A encoder 101 and error correction B encoder 102 is sent to a digital signal selection section 103.

Transmitting apparatus 100 has a modulation method and error correction method decision section 104, to which a propagation path estimation signal S1 is input. This propagation path estimation signal S1 is obtained based on the SIR (Signal to Interference Ratio), etc., of a signal received from a communicating radio station by the receiving section of transmitting apparatus 100 (not shown).

Modulation method and error correction method decision section 104 decides the modulation method and error correction method in accordance with propagation path estimation signal S1. In actuality, when the effects of fading fluctuations or noise are great, and a propagation path estimation signal S1 indicating that the propagation path state is poor is input, a modulation method with good error tolerance such as BPSK (Binary Phase Shift Keying) or QPSK, for example, is selected as the modulation method, and an error correction method with a high degree of redundancy is decided on as the error correction method.

Modulation method information S2 and error correction method information S3 decided by modulation method and error correction method decision section 104 are sent to digital signal selection section 103, a transmission baseband signal selection section 106, and a control information modulation section 105.

Digital signal selection section 103 selects the output of either error correction A encoder 101 or error correction B encoder 102 based on error correction method information S3, and sends this output to a BPSK modulation section 107, QPSK modulation section 108, 16QAM modulation section 109, and 64QAM modulation section 110.

Modulation sections 107 through 110 execute digital modulation processing on the digital signal input from digital signal selection section 103, and send signals that have undergone modulation processing to transmission baseband signal selection section 106. Transmission baseband signal selection section 106 selects a modulated signal from among the input plurality of modulated signals in accordance with modulation method information S2. For example, when the propagation path state is poor and modulation method information S2 indicating BPSK modulation or QPSK modulation is input, a BPSK modulated signal or QPSK modulated signal is output selectively in accordance with this input.

The modulated signal selected by transmission baseband signal selection section 106, and signals indicating the modulation method and error correction method modulated by control information modulation section 105, are input to a frame configuration section 111. Control information modulation section 105 executes modulation processing with high error tolerance, such as BPSK modulation or QPSK modulation, on input signals. By this means, the error tolerance of signals relating to the modulation method and error correction method, which is extremely important information, is raised on the receiving side.

Figure 3:
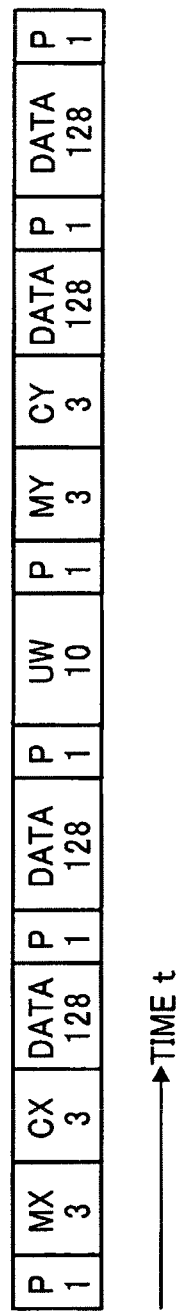
FIG. 3 is a drawing showing a transmit frame configuration according to Embodiment 1.

Frame configuration section 111 according to this embodiment configures a transmit frame as shown in FIG. 3, comprising, in order from the start of the frame, one pilot symbol P, three consecutive modulation method information symbols MX, three consecutive error correction method information symbols CX, 128 data symbols DATA, a pilot symbol P, data symbols DATA, a pilot symbol P, a 10-symbol unique word UW, a pilot symbol P, modulation method information symbols MY, error correction method information symbols CY, data symbols DATA, a pilot symbol P, data symbols DATA, and a pilot symbol P.

Here, modulation method information symbols MX and modulation method information symbols MY are the same symbols, and error correction method information symbols CX and error correction method information symbols CY are the same symbols. Thus, frame configuration section 111 places modulation method information symbols MX and MY, and error correction method information symbols CX and CY, discretely within the same frame. In other words, modulation method information symbols MX and modulation method information symbols MY are placed at different locations in the frame, and error correction method information symbols CX and error correction method information symbols CY are placed at different locations in the frame.

Figure 4:
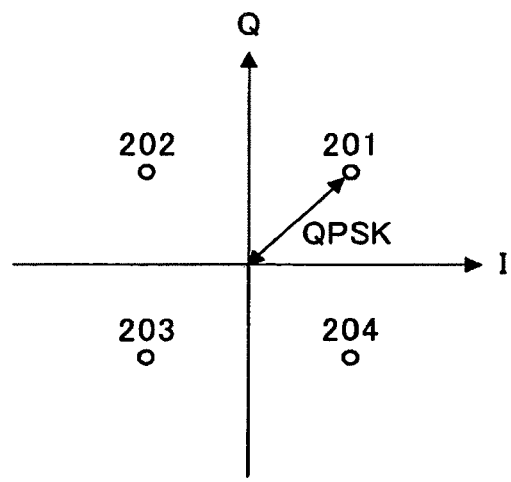
FIG. 4 is an I-Q plane diagram provided to explain a case where modulation method information is QPSK modulated.

The way in which modulation of a consecutive plurality of symbols (in the case of this embodiment, three symbols) indicating modulation method information is carried out by control information modulation section 105 will now be described. To consider the case where the three consecutive modulation method information symbols MX and MY are created by QPSK modulation as shown in FIG. 4, there is a method whereby, for example, signal point 201 is mapped at modulation method information symbols MX and MY when the information symbol modulation method is BPSK modulation, signal point 202 is mapped in the case of QPSK modulation, signal point 203 is mapped in the case of 16QAM, and signal point 204 is mapped in the case of 64QAM.

As another way of performing modulation, there is a method whereby, for example, mapping is performed at 201, 202, and 203 in temporal order when the information symbol modulation method is BPSK modulation, at 202, 204, and 203 in temporal order in the case of QPSK modulation, at 204, 201, and 203 in temporal order in the case of 16QAM, and at 202, 204, and 201 in temporal order in the case of 64QAM.

Figure 5:
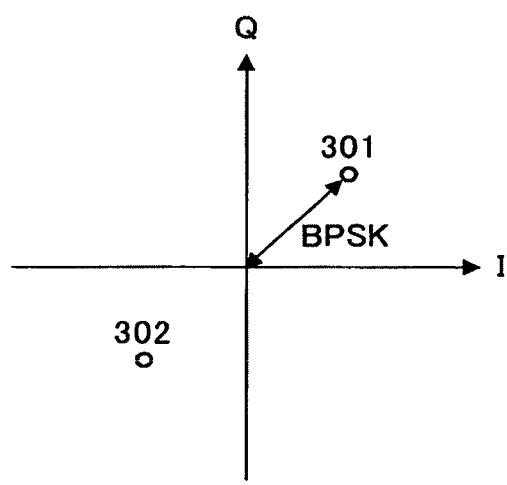
FIG. 5 is an I-Q plane diagram provided to explain a case where error correction method information is BPSK modulated.

The way in which modulation of a consecutive plurality of symbols (in the case of this embodiment, three symbols) indicating error correction method information is carried out will now be described. To consider the case where the three consecutive error correction method information symbols CX and CY are created by BPSK modulation as shown in FIG. 5, there is a method whereby, for example, signal point 301 is mapped at error correction method information symbols CX and CY when error correction method A is used, and signal point 302 is mapped when error correction method B is used.

As another way of performing modulation, there is a method whereby, for example, mapping is performed at 301, 302, and 302 in temporal order when error correction method A is used, and at 302, 301, and 301 in temporal order when error correction method B is used.

When the former method is used here (when mapping is performed with signal points fixed), high-precision estimation is possible with few symbols, and therefore the modulation method and error correction method can be estimated on the receiving side by the simple method of BPSK or QPSK modulation method detection. When the latter method is used (when signal points are mapped in temporal order), on the other hand, even if there are no symbols for time synchronization of the transmitting apparatus and receiving apparatus, modulation method information symbols and error correction method information symbols can be used as symbols for time synchronization of the transmitting apparatus and receiving apparatus. On the other hand, complex computations known as serial correlation computations are necessary in the receiving apparatus.

The signal output from frame configuration section 111 undergoes digital-analog conversion and signal amplification processing by a radio section 112, and is then transmitted by an antenna 113.

Figure 6:
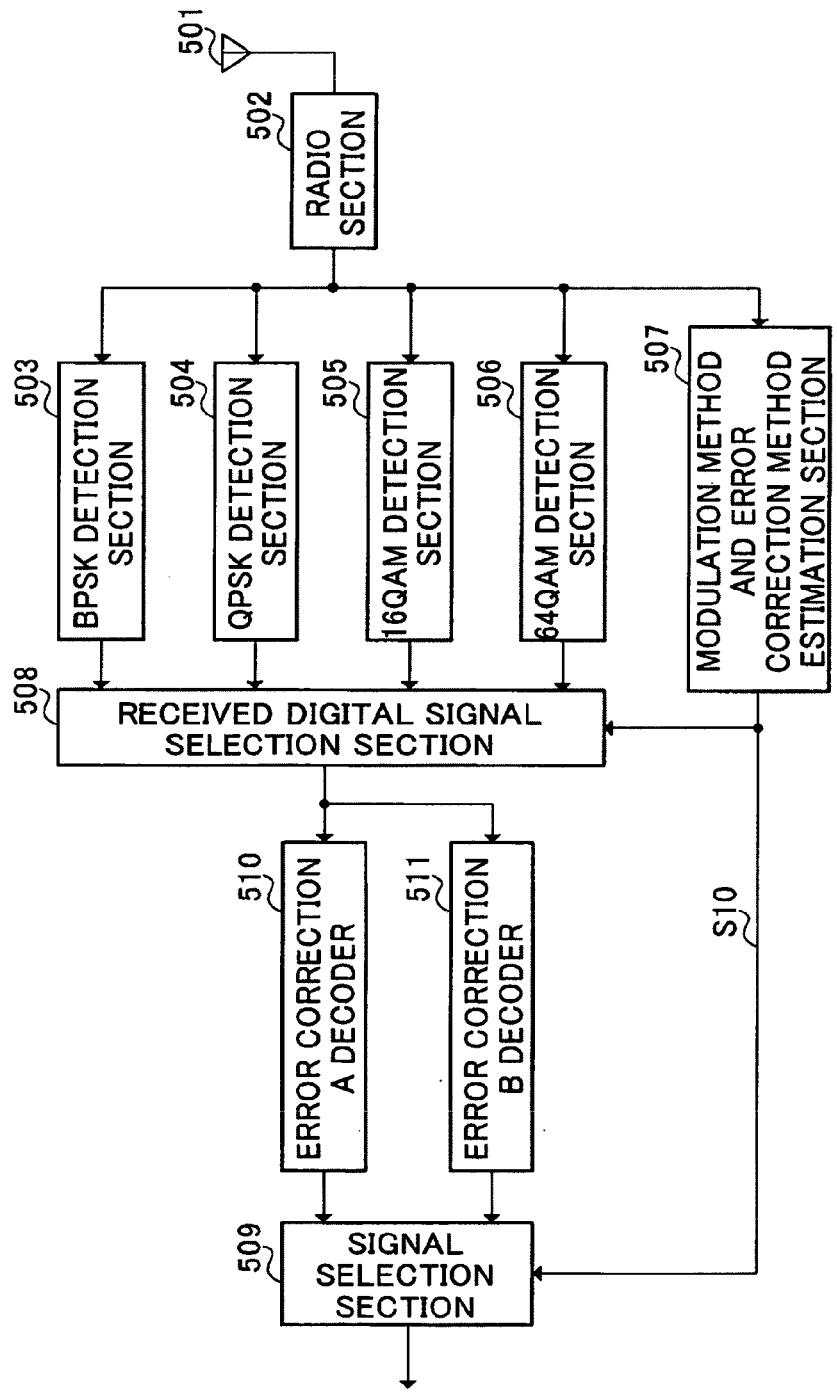
FIG. 6 is a block diagram showing the configuration of a receiving apparatus according to Embodiment 1 of the present invention.

FIG. 6 shows the configuration of a receiving apparatus 500 that receives and demodulates a signal transmitted from transmitting apparatus 100. Receiving apparatus 500 executes predetermined radio reception processing such as amplification processing and analog-digital conversion processing in a radio section 502 on a reception signal received by an antenna 501, thereby obtaining an orthogonal baseband signal, and sends this signal to detection sections 503 through 506 and a modulation method and error correction method estimation section 507.

Detection sections 503 through 506 comprise a BPSK detection section 503, QPSK detection section 504, 16QAM detection section 505, and 64QAM detection section 506. The received baseband signals detected by detection sections 503 through 506 are sent to a received digital signal selection section 508.

Modulation method and error correction method estimation section 507 detects modulation method information symbols MX and MY, and error correction method information symbols CX and CY, shown in FIG. 3, from the received orthogonal baseband signal, estimates the modulation method and error correction method based on these information symbols MX, MY, CX, and CY, and sends estimation result S10 to received digital signal selection section 508 and a signal selection section 509.

Figure 7:
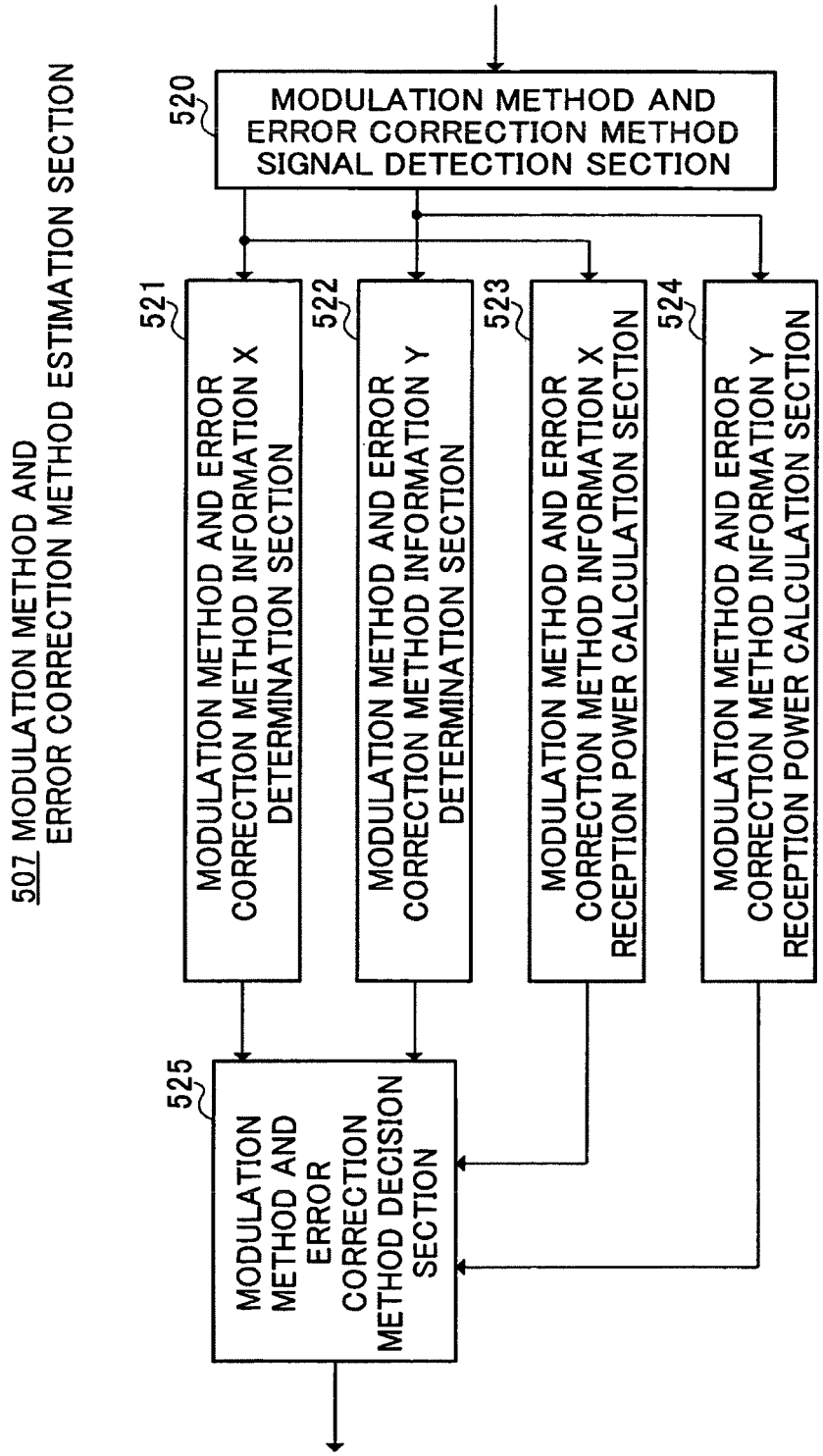
FIG. 7 is a block diagram showing the configuration of a modulation method and error correction method estimation section.

Modulation method and error correction method estimation section 507 is configured as shown in FIG. 7. That is to say, in modulation method and error correction method estimation section 507, the received orthogonal baseband signal output from radio section 502 is input to a modulation method and error correction method signal detection section 520. Modulation method and error correction method signal detection section 520 performs coherent detection of modulation method information symbols MX and MY and error correction method information symbols CX and CY based on unique word UW contained in the received orthogonal baseband signal, and by executing BPSK demodulation processing or QPSK demodulation processing thereon, detects and demodulates modulation method information symbols MX and MY and error correction method information symbols CX and CY.

A modulation method and error correction method information X determination section 521 determines and detects modulation method information symbols MX and error correction method information symbols CX shown in FIG. 3 from the detected modulation method information symbols MX and MY and error correction method information symbols CX and CY. Similarly, a modulation method and error correction method information Y determination section 522 determines and detects modulation method information MY and error correction method information CY shown in FIG. 3 from the detected modulation method information symbols MX and MY and error correction method information symbols CX and CY.

Here, as is clear from FIG. 3, these modulation method information symbols MX and error correction method information symbols CX, and modulation method information symbols MY and error correction method information symbols CY, are arranged discretely at separate locations in a transmission frame, and are arranged at regular intervals. Therefore, modulation method and error correction method information X determination section 521 and modulation method and error correction method information Y determination section 522 can easily determine and detect these information symbols based on pilot symbols P, for example.

A modulation method and error correction method information X reception power calculation section 523 calculates the reception power of modulation method information symbols MX and error correction method information symbols CX. Similarly, a modulation method and error correction method information Y reception power calculation section 524 calculates the reception power of modulation method information symbols MY and error correction method information symbols CY. Actually, the locations of modulation method information symbols MX and error correction method information symbols CX, and modulation method information symbols MY and error correction method information symbols CY, arranged discretely within a frame, are detected based on pilot symbols P and unique word UW, and the reception power of modulation method information symbols MX and error correction method information symbols CX, and the reception power of modulation method information symbols MY and error correction method information symbols CY, are calculated.

A modulation method and error correction method decision section 525 weights modulation method information MX and error correction method information CX obtained by means of modulation method and error correction method information X determination section 521 with the reception power obtained by means of modulation method and error correction method information X reception power calculation section 523. Similarly, modulation method and error correction method decision section 525 weights modulation method information symbols MY and error correction method information symbols CY obtained by means of modulation method and error correction method information Y determination section 522 with the reception power obtained by means of modulation method and error correction method information Y reception power calculation section 524.

Then modulation method and error correction method decision section 525 decides the modulation method and error correction method by adding reception power weighted modulation method information symbols MX and MY and error correction method information symbols CX and CY. Thus, modulation method and error correction method estimation section 507 detects the reception power at discrete locations for modulation method information symbols MX and MY and error correction method information symbols CX and CY arranged discretely within a transmission frame, and by weighting and adding modulation method information symbols MX and MY and error correction method information symbols CX and CY according to this reception power, obtains final modulation method information and error correction method information.

Returning now to FIG. 6, receiving apparatus 500 will be described. Received digital signal selection section 508 selects from the outputs of BPSK detection section 503, QPSK detection section 504, 16QAM detection section 505, and 64QAM detection section 506, the output corresponding to the modulation method estimated by modulation method and error correction method estimation section 507, and then sends this output to an error correction A decoder 510 and error correction B decoder 511.

Reception demodulated signals decoded by error correction A decoder 510 and error correction B decoder 511 using different error correction methods are sent to signal selection section 509. Signal selection section 509 selects from error correction A decoder 510 and error correction B decoder 511 the output corresponding to the error correction method estimated by modulation method and error correction method estimation section 507, and outputs this as the final reception decoded signal.

In the above configuration, transmitting apparatus 100 adaptively performs digital modulation of data symbols DATA using modulation methods with different error tolerance, and error correction processing using error correction methods with different error tolerance, according to the state of the propagation path.

In addition, transmitting apparatus 100 transmits with modulation method information symbols MX and MY and error correction method information symbols CX and CY arranged discretely within a transmit frame. Modulation method information symbols MX and MY and error correction method information symbols CX and CY are transmitted modulated using a modulation method with good error tolerance, such as BPSK modulation or QPSK modulation.

Figure 8:
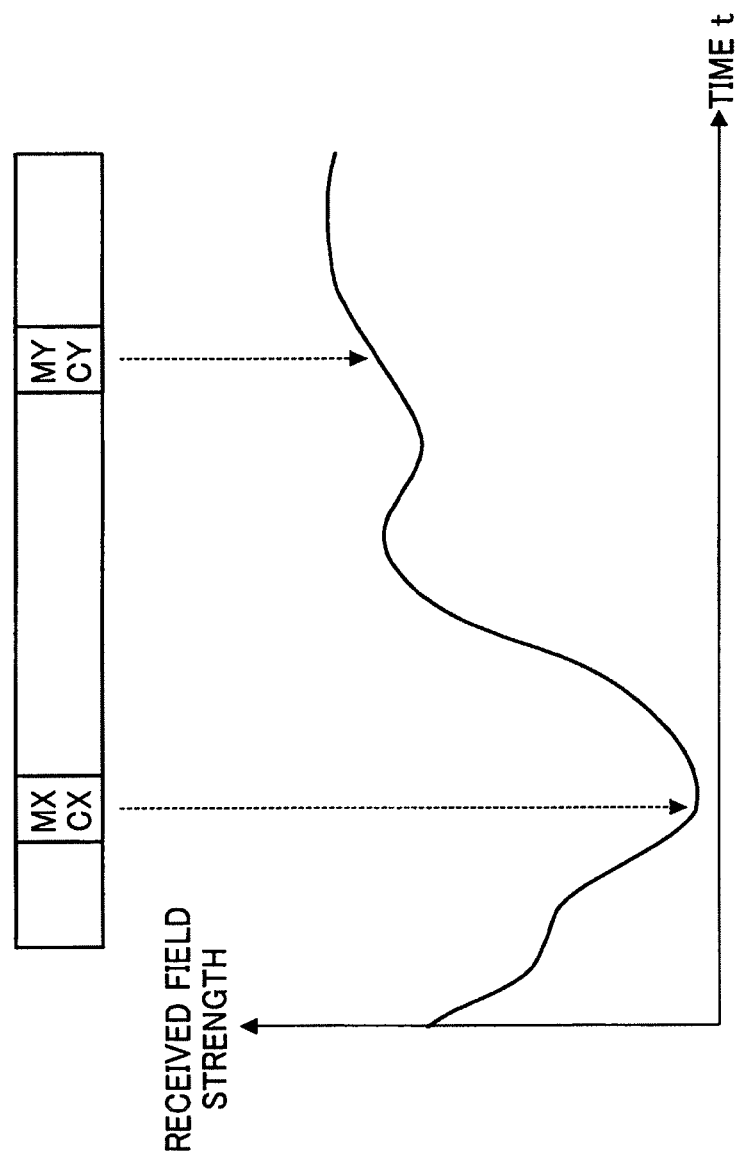
FIG. 8 is a drawing showing the received field strength of a received signal when fading or propagation path fluctuations are experienced.

On receiving this transmit signal, receiving apparatus 500 first calculates the reception power of discretely arranged modulation method information signals MX and MY and error correction method information signals CX and CY. As shown in FIG. 8, the reception power of a received signal varies over time due to the effects of fading and so forth. As a result, of discretely arranged modulation method information signals MX and MY and error correction method information signals CX and CY, modulation method information signal MX and error correction method information signal CX may have low reception power (received field strength), for example, while modulation method information signal MY and error correction method information signal CY have high reception power.

In general, a signal of higher reception power has a lower error rate in demodulation, and therefore receiving apparatus 500 multiplies modulation method information signal MX and error correction method information signal CX, whose reception power is low, by a low-valued weighting coefficient, and multiplies modulation method information signal MY and error correction method information signal CY, whose reception power is high, by a high-valued weighting coefficient. These added values are then taken as final modulation method information and error correction method information.

As a result, correct modulation method information and error correction method information can be obtained even in the event of propagation path fluctuations or fading.

Receiving apparatus 500 selects data demodulated by means of a demodulation method corresponding to the acquired modulation method information, and selects reception decoded data that has undergone error correction decoding processing corresponding to the acquired error correction method information, to obtain final receive data.

As a result, it is possible to obtain a signal that has been demodulated and decoded by means of an appropriate modulation method and an appropriate error correction method, thereby enabling reception quality to be improved.

A description will be given here of a discrete arrangement method for further improving the estimation precision for modulation method and error correction method information. In order to restore modulation method and error correction method information correctly, the received field strength of each information symbol need only be at or above a certain level. Thus, it is sufficient if there are symbols whose received field strength is at or above a certain level among discretely arranged modulation method information and error correction method information symbols.

Thus, in this embodiment, it is proposed that discretely arranged temporal locations be selected taking account of a time that is the reciprocal of the Doppler frequency. Specifically, if the maximum Doppler frequency stipulated in a radio communication system to which transmitting apparatus 100 and receiving apparatus 500 belong is designated fd, modulation method information signals MX and MY and error correction method information signals CX and CY should be arranged at locations separated by a time of approximately 1/fd.

By this means, even if the received field strength declines due to fading, the decline in the received field strength at one or other of the locations of modulation method information signals MX and MY and error correction method information signals CX and CY can be kept within permissible values, enabling the error rate of modulation method information and error correction method information to be kept down.

For example, if discrete locations are selected as extremely close locations, when the received field strength declines due to fading the received field strength of all discretely arranged symbols will decline, and the error rate of all modulation method and error correction method information will increase. Considering this point, the locations at which modulation method and error correction method information is arranged may be decided simply as near the start, near the middle, or near the end, within a frame.

According to the above configuration, when the modulation method or error correction method is switched adaptively according to the state of the propagation path, the transmitting side transmits with modulation method information symbols MX and MY and error correction method information symbols CX and CY arranged discretely within a transmit frame, and the receiving side detects the reception power of discretely arranged modulation method information symbols MX and MY and error correction method information symbols CX and CY at each location, finds the final modulation method and error correction method by weighting the discretely arranged modulation method information and error correction method information according to the size of the reception power, and obtains a demodulated and decoded signal based thereon, thereby making it possible to obtain a transmitting apparatus 100 and receiving apparatus 500 that enable degradation of communication quality to be suppressed even in the event of noise or propagation path fluctuations.

Also, by making modulation method information symbols MX and MY and error correction method information symbols CX and CY not a single symbol but a plurality of symbols (in the case of this embodiment, three symbols), it is possible for modulation method information and error correction method information to be transmitted more accurately.

Furthermore, by transmitting modulation method information symbols MX and MY and error correction method information symbols CX and CY modulated using BPSK modulation or QPSK modulation, which are modulation methods tolerant of fading and propagation path fluctuations, it is possible for modulation method information and error correction method information to be transmitted more accurately.

In this embodiment, a case has been described in which final modulation method information and error correction method information is obtained by weighting discretely arranged modulation method information and error correction method information according to reception power, but the present invention is not limited to this, and it is also possible for only the modulation method information and error correction method information with the larger reception power to be taken as the final modulation method information and error correction method information. For example, when, as shown in FIG. 8, the reception power of modulation method information MY and error correction method information CY is higher than the reception power of modulation method information MX and error correction method information CX, modulation method information MY and error correction method information CY may be selected.

Also, in this embodiment, a case has been described in which the transmission power of symbols indicating the modulation method and error correction method is made the same as the transmission power of data symbols and pilot symbols, but if the transmission power (that is, the maximum signal amplitude) of symbols indicating the modulation method and error correction method is made higher than the transmission power (maximum signal amplitude) of other symbols, it is possible for modulation method information and error correction method information to be received with greater accuracy by the receiving side.

Moreover, in this embodiment, a case has been described in which a transmit frame such as that shown in FIG. 3 is configured by transmitting apparatus 100, but the frame configuration is not limited to that shown in FIG. 3. Similarly, modulation method information symbols and error correction method information symbols are inserted as three consecutive symbols at two discrete locations, but this is not a limitation.

Furthermore, the configurations of a transmitting apparatus, receiving apparatus, and modulation method and error correction method estimation section according to the present invention are not limited to those shown in FIG. 2, FIG. 6, or FIG. 7. In particular, in this embodiment the number of locations at which modulation method information and error correction method information is discretely arranged is two, and therefore in the configuration of modulation method and error correction method estimation section 507 in FIG. 7 two modulation method and error correction method information determination sections and two modulation method and error correction method information reception power calculation sections are provided, but these numbers are in accordance with the number of discretely inserted modulation method information symbols and error correction method information symbols, and a number may be provided accordingly.

In addition, in this embodiment, a case has been described in which modulation method information and error correction method information are transmitted, but the same kind of effect as in this embodiment can also be obtained when the present invention is applied to a transmitting apparatus and receiving apparatus between which only one of these is transmitted. For example, if the present invention is used in a system in which only modulation method information is transmitted, it will be possible for modulation method information to be transmitted correctly to the receiving side.

(Embodiment 2)

Figure 9:
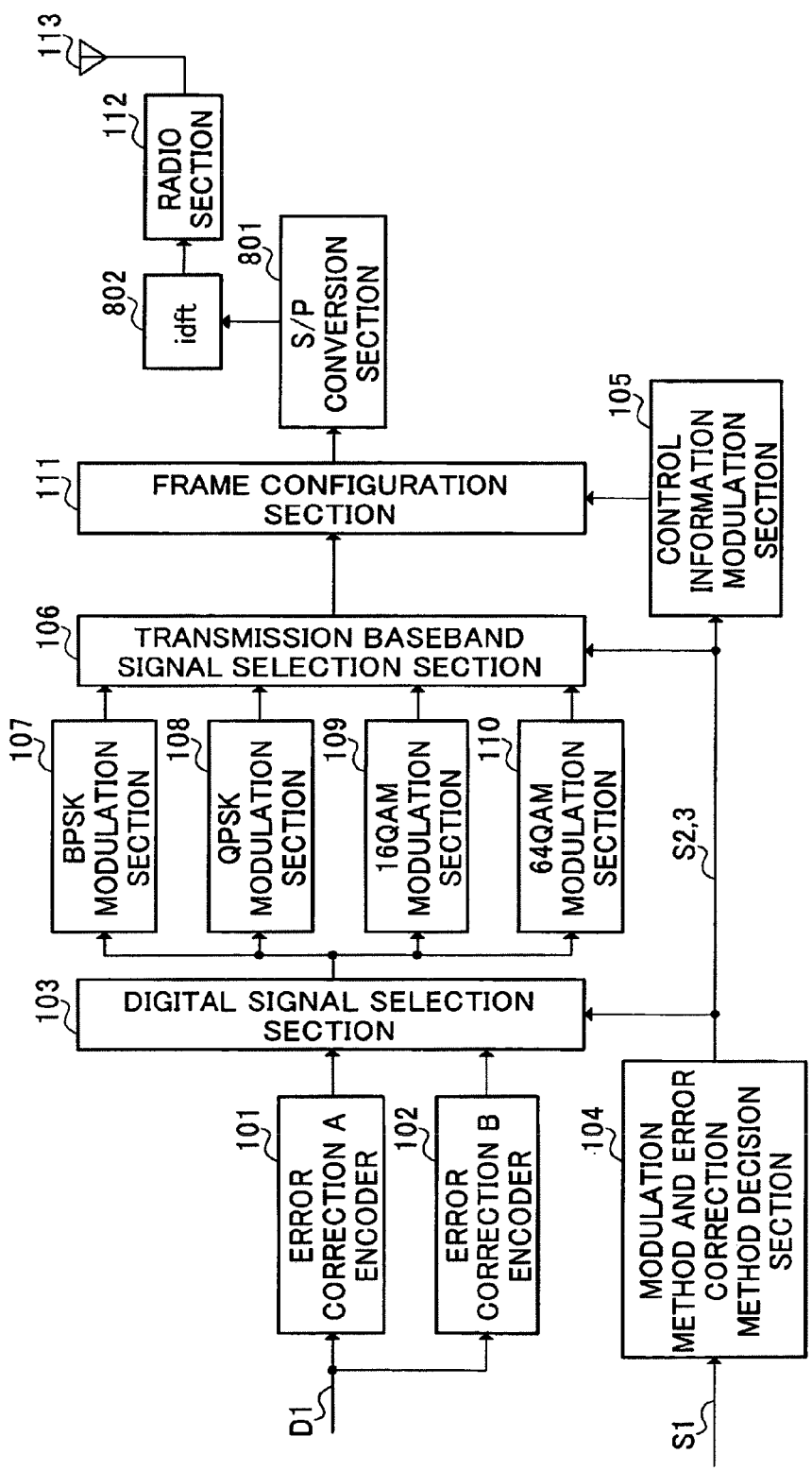
FIG. 9 is a block diagram showing the configuration of a transmitting apparatus according to Embodiment 2.

FIG. 9, in which parts corresponding to those in FIG. 2 are assigned the same codes as in FIG. 2, shows the configuration of a transmitting apparatus according to Embodiment 2 of the present invention. Transmitting apparatus 800 transmits a transmit signal arranged in a mutually orthogonal plurality of subcarriers by means of OFDM (Orthogonal Frequency Division Multiplexing).

Specifically, by executing serial/parallel conversion processing on the output of frame configuration section 111 by means of a serial/parallel conversion section (S/P conversion section) 801, and then executing inverse Fourier transform processing on the parallel signals resulting from this processing by means of an inverse Fourier transform section (idft) 802, a transmit signal with the signal arrangement shown in FIG. 10(A) or FIG. 10(B) is formed. Divisions in the frequency direction in FIG. 10(A) and FIG. 10(B) indicate subcarrier demarcations. That is to say, FIG. 10(A) and FIG. 10(B) show examples in which a demodulated signal is transmitted using 10 mutually orthogonal subcarriers.

In the example shown in FIG. 10(A), an error correction method information symbol is arranged discretely in subcarriers of different frequency at the same time, and a modulation method information symbol is arranged discretely in subcarriers of different frequency at the same time. By using this kind of arrangement, even if frequency selective fading that causes a decline in the gain of a certain frequency occurs on the propagation path, for example, the signal level of one error correction method information symbol and modulation method information symbol is maintained, enabling an error correction method information signal and modulation method information signal with a signal level greater than or equal to a predetermined value to be obtained on the receiving side.

In the example shown in FIG. 10(B), an error correction method information symbol is arranged at different times in a subcarrier of the same frequency, and a modulation method information symbol is arranged at different times in a subcarrier of the same frequency. By using this kind of arrangement, even if propagation path fluctuations occur over time, for example, the signal level of an error correction method information symbol and modulation method information symbol at a particular point in time is maintained, enabling an error correction method information signal and modulation method information signal with a signal level greater than or equal to a predetermined value to be obtained on the receiving side.

Figure 11:
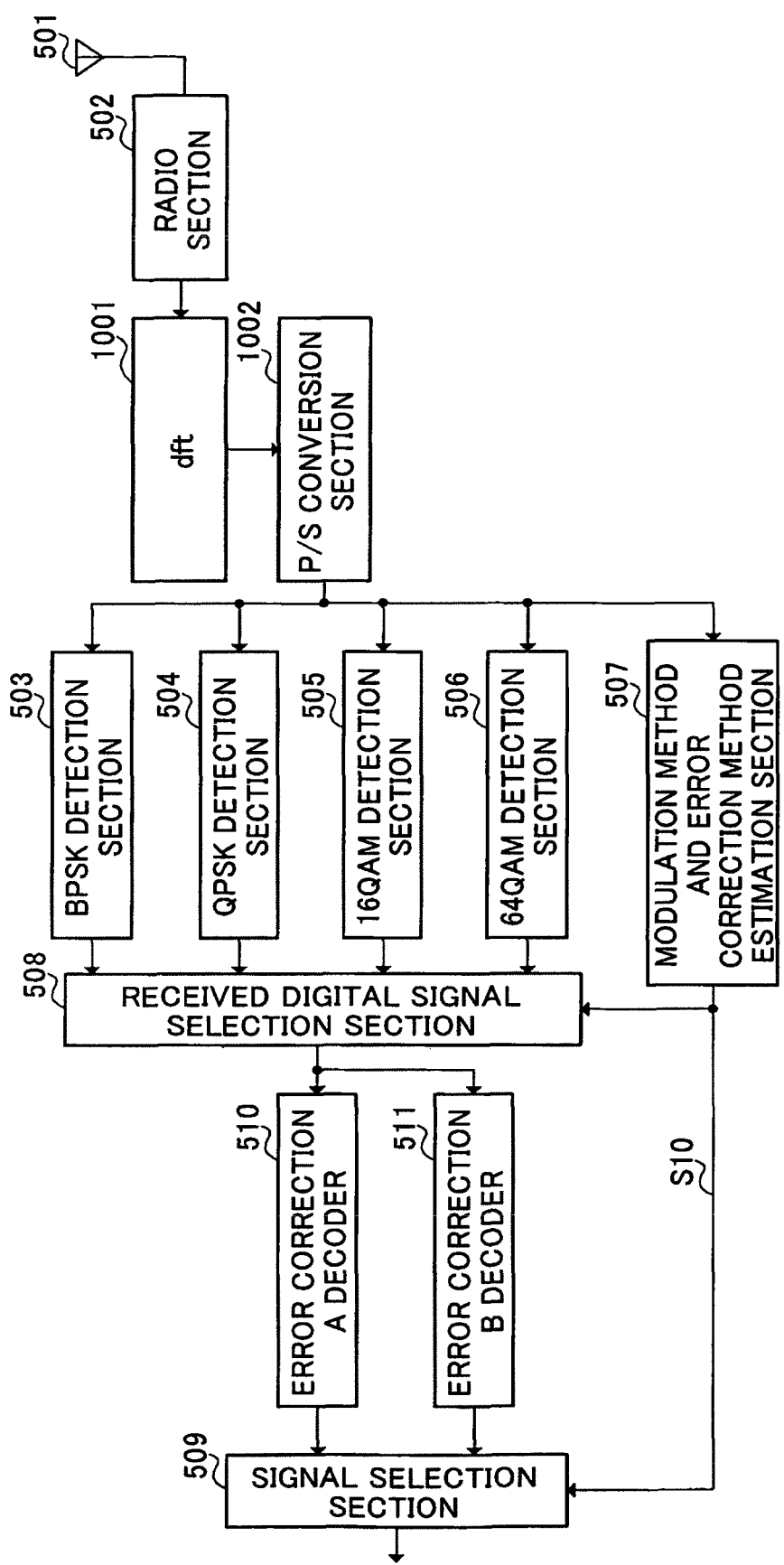
FIG. 11 is a block diagram showing the configuration of a receiving apparatus according to Embodiment 2.

The configuration of a receiving apparatus that receives an OFDM signal transmitted by transmitting apparatus 800 is shown in FIG. 11. In FIG. 11, in which parts corresponding to those in FIG. 6 are assigned the same codes as in FIG. 6, receiving apparatus 1000 executes Fourier transform processing on the output of radio section 502 by means of a Fourier transform section (dft) 1001, and executes parallel/serial conversion of the signal resulting from Fourier transform processing by means of a parallel/serial conversion section (P/S conversion section) 1002. As a result, a signal with the frame configuration shown in FIG. 3 is obtained from the orthogonal. frequency division multiplexed received signal. Subsequent processing is the same as that described in Embodiment 1.

According to the above configuration, when an OFDM signal is formed from a transmit signal containing an error correction method information signal and modulation method information signal, and transmitted, by arranging the error correction method information signal and modulation method information signal discretely in different subcarriers or at temporally separated locations in the same subcarrier, it is possible for an error correction method information signal and modulation method information signal of the necessary signal level or higher to be obtained on the receiving side. As a result, the modulation method and error correction method of a digitally modulated signal can be determined correctly on the receiving side.

In this embodiment a case has been described in which OFDM modulation processing is executed on output of frame configuration section 111—that is, OFDM modulation processing is executed on a signal with the frame configuration shown in FIG. 3—but the present invention is not limited to this, and the key point is that, when an OFDM signal is formed from a transmit signal containing an error correction method information signal and modulation method information signal, and transmitted, the same kind of effect as in the above-described embodiment can be obtained if the error correction method information signal and modulation method information signal are discretely arranged in different subcarriers or at temporally separated locations in the same subcarrier.

The present invention is not limited to the above-described embodiments, and various variations and modifications may be possible without departing from the scope of the present invention.

A transmitting apparatus according to the present invention has a configuration comprising a modulation method information signal generation section that generates an information signal relating to the modulation method of information symbols, an error correction method information signal generation section that generates an information signal relating to the error correction method of information symbols, a frame forming section that forms a transmit frame by discretely arranging a modulation method information signal and/or error correction method information signal, and a transmission section that transmits the transmit frame.

According to this configuration, since a modulation method information signal and/or error correction method information signal are/is arranged discretely, the possibility is low that both discretely arranged signals will degrade even if the transmit signal experiences fading or propagation path fluctuations. As a result, it is possible for the modulation method information signal and/or error correction method information signal to be restored accurately on the receiving side.

A transmitting apparatus according to the present invention has a configuration wherein a modulation method information signal generation section and/or error correction method information signal generation section generate(s) a modulation method information signal or error correction method information signal comprising a plurality of symbols.

According to this configuration, propagation path error tolerance is improved compared with the case where a modulation method information signal and/or error correction method information signal are/is formed by a single symbol, making it possible for the modulation method information signal and/or error correction method information signal to be restored more accurately on the receiving side.

A transmitting apparatus according to the present invention has a configuration wherein a frame forming section discretely arranges a modulation method information signal and/or error correction method information signal at locations separated by a predetermined time or more according to the Doppler frequency.

According to this configuration, even if the received field strength declines due to fading, the decline in the received field strength at one or other of the locations of discretely arranged modulation method information signals and error correction method information signals can be kept within permissible values, enabling the error rate of modulation method information and error correction method information to be kept down even when fading occurs. For example, if discrete locations are selected as extremely close locations, when the received field strength declines due to fading the received field strength of all discretely arranged symbols will decline, and the error rate of all modulation method and error correction method information will increase. In this configuration this point is taken into consideration, and discretely arranged locations are selected optimally taking account of the Doppler frequency, which is closely linked to fading.

A transmitting apparatus according to the present invention has a configuration wherein a transmission section transmits a transmit frame with the maximum signal point amplitude of a modulation method information signal and/or error correction method information signal made larger than the maximum signal point amplitude of an information symbol.

According to this configuration, since the signal point interval of a modulation method information signal and error correction method information signal is increased, it is possible for the modulation method information signal and/or error correction method information signal to be restored more accurately on the receiving side.

A transmitting apparatus according to the present invention has a configuration whereby a modulation method information signal and/or error correction method information signal are/is transmitted modulated by means of BPSK modulation or QPSK modulation.

According to this configuration, since highly error tolerant BPSK modulation or QPSK modulation is used as the information signal and/or error correction method information signal modulation method, it is possible for the modulation method information signal and/or error correction method information signal to be restored more accurately on the receiving side.

A transmitting apparatus according to the present invention has a configuration whereby a modulation method information signal and/or error correction method information signal are/is arranged discretely in a mutually orthogonal plurality of subcarriers.

According to this configuration, even when frequency selective fading occurs, the possibility is high that the decline in signal level due to fading will be small for the modulation method information signal and/or error correction method information signal of at least one subcarrier among the modulation method information signals and/or error correction method information signals arranged discretely in different subcarriers, and it is therefore possible for an error correction method information signal and/or modulation method information signal of the necessary signal level or higher to be obtained on the receiving side.

A receiving apparatus according to the present invention receives and demodulates a received signal that contains an information signal, a modulation method information signal relating to the modulation method of the information signal, and an error correction method information signal relating to the error correction method of the information signal, and wherein the modulation method information signal and error correction method information signal are arranged at discrete locations within the same frame; and this receiving apparatus comprises a reception power detection section that detects reception power for the discretely arranged modulation method information signal and error correction method information signal at the respective locations, a decision section that decides the modulation method and error correction method by performing weighting according to the respective reception power on a modulation method information signal and error correction method information signal arranged at a location corresponding to reception power detected by the reception power detection section, and a signal selection section that selects a demodulated signal obtained by executing demodulation processing and error correction processing corresponding to the modulation method and error correction method decided by the decision section.

According to this configuration, attention is paid to the fact that errors are fewer in demodulation the higher the reception power at the location of a signal, and the modulation method and error correction method are decided by weighting a discretely arranged modulation method information signal and error correction method information signal with reception power. As a result, the correct modulation method and error correction method can be decided, and by performing demodulation processing and error correction processing in accordance therewith, a high-quality received signal can be obtained.

A receiving apparatus according to the present invention receives and demodulates a received signal that contains an information signal, a modulation method information signal relating to the modulation method of the information signal, and an error correction method information signal relating to the error correction method of the information signal, and wherein the modulation method information signal and error correction method information signal are arranged at discrete locations within the same frame; and this receiving apparatus comprises a reception power detection section that detects reception power for the discretely arranged modulation method information signal and error correction method information signal at the respective locations, a decision section that decides the modulation method and error correction method by selecting a modulation method information signal and error correction method information signal arranged at a location corresponding to reception power detected by the reception power detection section, and a signal selection section that selects a demodulated signal obtained by executing demodulation processing and error correction processing corresponding to the modulation method and error correction method decided by the decision section.

According to this configuration, attention is paid to the fact that errors are fewer in demodulation the higher the reception power at the location of a signal, and of the discretely arranged modulation method information signals and error correction method information signals, the modulation method and error correction method of the signals with higher reception power are selected. As a result, accurate modulation method and error correction method signals with few errors in demodulation can be obtained, and by performing demodulation processing and error correction processing in accordance therewith, a high-quality received signal can be obtained.

A transmission method according to the present invention generates a modulation method information signal relating to the modulation method of information symbols and also generates an error correction method information signal relating to the error correction method of information symbols, forms a transmit frame by discretely arranging a modulation method information signal and/or error correction method information signal, and transmits the transmit frame.

According to this method, since a modulation method information signal and/or error correction method information signal are/is arranged discretely, the possibility is low that both discretely arranged signals will degrade even if the transmit signal experiences fading or propagation path fluctuations. As a result, it is possible for the modulation method information signal and/or error correction method information signal to be restored accurately on the receiving side.

A reception method according to the present invention receives and demodulates a received signal that contains an information signal, a modulation method information signal relating to the modulation method of the information signal, and an error correction method information signal relating to the error correction method of the information signal, and wherein the modulation method information signal and error correction method information signal are arranged at discrete locations within the same frame; and this reception method detects reception power for the discretely arranged modulation method information signal and error correction method information signal at the respective locations, decides the modulation method and error correction method by selecting a modulation method information signal and error correction method information signal arranged at a location corresponding to detected reception power, and selects a demodulated signal obtained by executing demodulation processing and error correction processing corresponding to the decided modulation method and error correction method.

According to this method, attention is paid to the fact that errors are fewer in demodulation the higher the reception power at the location of a signal, and of the discretely arranged modulation method information signals and error correction method information signals, the modulation method and error correction method of the signals with higher reception power are selected. As a result, accurate modulation method and error correction method signals with few errors in demodulation can be obtained, and by performing demodulation processing and error correction processing in accordance therewith, a high-quality received signal can be obtained.

As described above, according to the present invention, in a communication system in which propagation path error tolerance is improved by switching the modulation method or error correction method adaptively according to the state of the propagation path, by transmitting signals indicating the modulation method and error correction method used by the transmitting side arranged at discrete locations within the same frame, it is possible for the modulation method and error correction method of a digitally modulated signal to be determined correctly on the receiving side, enabling communication quality to be improved.

This application is based on Japanese Patent Application No. 2001-356400 filed on Nov. 21, 2001, entire contents of which are expressly incorporated by reference herein.

INDUSTRIAL APPLICABILITY

The present invention is applicable, for example, to a digital radio communication system in which the modulation method or error correction method is changed adaptively according to the propagation path environment or the like.

What is claimed:

1. A transmission method, comprising:
   generating at least one data signal, each of the at least one data signal being mapped according to a first modulation method;
   generating at least one of an error correction method information signal and a modulation method information signal relating to the at least one data signal, each of the at least one of an error correction method information signal and a modulation method information signal being mapped according to a second modulation method and having a larger signal point amplitude than each of the at least one data signal;
   forming a transmission frame by repeating and discretely arranging at least one of the same error correction method information signal and the same modulation method information signal at locations separated by a predetermined time in a direction of time axis; and
   transmitting the at least one data signal and the at least one of the same error correction method information signal and the same modulation method information signal using the transmission frame.

2. The transmission method according to claim 1, wherein the predetermined time is a reciprocal of a maximum Doppler frequency.

3. The transmission method according to claim 1, wherein the at least one of the same error correction method information signal and the same modulation method information signal is modulated using QPSK or BPSK modulation.

4. A transmission apparatus, comprising:
   a data signal generator that generates at least one data signal, each of the at least one data signal being mapped according to a first modulation method;
   a control information signal generator that generates at least one of an error correction method information signal and a modulation method information signal relating to the at least one data signal, each of the at least one of an error correction method information signal and a modulation method information signal being mapped according to a second modulation method and having a larger signal point amplitude than each of the at least one data signal;
   a frame former that forms a transmission frame by repeating and discretely arranging at least one of the same error correction method information signal and the same modulation method information signal at locations separated by a predetermined time in a direction of time axis; and
   a transmitter that transmits the at least one data signal and the at least one of the same error correction method information signal and the same modulation method information signal using the transmission frame.

5. The transmission apparatus according to claim 4, wherein the predetermined time is a reciprocal of a maximum Doppler frequency.

6. The transmission apparatus according to claim 4, further comprising a modulator that modulates the at least one data signal and the at least one of the same error correction method information signal and the same modulation method information signal using QPSK or BPSK modulation.

7. The transmission method according to claim 1, wherein:
   the transmission frame has a first period and a second period in the same frame;
   the first period includes the at least one of the same error correction method information signal and the same modulation method information signal; and
   the second period includes the at least one data signal.

8. The transmission apparatus according to claim 4, wherein:
   the transmission frame has a first period and a second period in the same frame;
   the first period includes the at least one of the same error correction method information signal and the same modulation method information signal; and
   the second period includes the at least one data signal.

9. The transmission method according to claim 1, wherein
   at least one of the same error correction method information signal and the same modulation method information signal are repeatedly and discretely placed within the transmission frame at different locations, and
   at least one of each of the repeatedly placed error correction method information signals are the same and each of the repeatedly placed modulation method information signals are the same.

10. The transmission method according to claim 1, wherein the at least one of the same error correction method information signal and the same modulation method information signal is arranged in regular intervals within the transmission frame.

11. The transmission method according to claim 9, wherein
    the repeatedly placed error correction method information signals have low reception power and are multiplied by a low-value weighting coefficient, and
    the repeatedly placed modulation method information signals have high reception power, compared to the repeatedly placed error correction method information signals, and are multiplied by a high-valued weighting coefficient.

12. The transmission apparatus according to claim 4, wherein
    at least one of the same error correction method information signal and the same modulation method information signal are repeatedly and discretely placed within the transmission frame at different locations, and
    at least one of each of the repeatedly placed error correction method information signals are the same and each of the repeatedly placed modulation method information signals are the same.

13. The transmission apparatus according to claim 4, wherein the at least one of the same error correction method information signal and the same modulation method information signal is arranged in regular intervals within the transmission frame.

14. The transmission apparatus according to claim 12, wherein
    the repeatedly placed error correction method information signals have low reception power and are multiplied by a low-value weighting coefficient, and
    the repeatedly placed modulation method information signals have high reception power, compared to the repeatedly placed error correction method information signals, and are multiplied by a high-valued weighting coefficient.

15. The transmission method according to claim 1, wherein the transmission frame is formed for selecting the at least one of the same error correction method information signal and the same modulation method information signal based on a higher power reception of the signals.

16. The transmission method according to claim 1, wherein the transmission frame is configured such that the at least one of the same error correction method information signal and the same modulation method information signal are decided by performing weighting according to a reception power on the signal arranged at a location corresponding to reception power detected; and a demodulated signal is obtained by executing demodulation processing and error correction processing corresponding to the at least one of the decided same error correction method information signal and the decided same modulation method information signal is selected.

\* \* \* \* \*